BEST AVAILABLE COPY

D. HUMPHREYS.

SEPARABLE BUTTON.

No. 10,227. Reissued Oct. 31, 1882.

WITNESSES

Villette Anderson.
Philip Lemasi.

INVENTOR

David Humphreys
by Anderson & Smith
his ATTORNEYS

N. PETERS, Photo-Lithographer, Washington, D. C.

UNITED STATES PATENT OFFICE.

DAVID HUMPHREYS, OF NORFOLK, VIRGINIA.

SEPARABLE BUTTON.

SPECIFICATION forming part of Reissued Letters Patent No. 10,227, dated October 31, 1882.

Original No. 259,159, dated June 6, 1882. Application for reissue filed September 8, 1882.

*To all whom it may concern:*

Be it known that I, DAVID HUMPHREYS, a citizen of the United States, residing at Norfolk, in the county of Norfolk and State of Virginia, have invented certain new and useful Improvements in Separable Buttons, of which the following is a specification, reference being had therein to the accompanying drawings.

Figure 1:
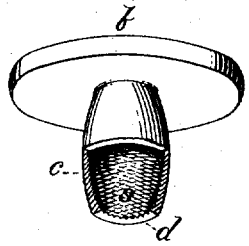
Figure 2:
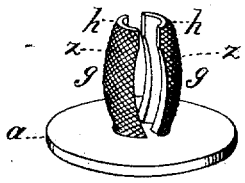

Figure 1 of the drawings is a perspective view of the back portion of the button, and Fig. 2 is a perspective view of the front portion.

This invention has relation to separable buttons for fastening collars, cuffs, and other articles; and it consists in providing the back disk with an open end, hollow, convex, or barrel-shaped stem, and the corresponding face-piece with two or more elastic outwardly-bowed arms or prongs, designed to enter the hollow stem, and, expanding within the same, to hold the two parts in connection, all as hereinafter set forth.

In the accompanying drawings, the letter *a* designates the head or ornamental piece or face-disk of the button or stud, and *b* the back or under plate or disk.

To the under side of the head or ornamental plate or disk *a* are firmly attached two or more outwardly-bowed arms or prongs, *g*, having convergent free ends *h*.

To one side of the back disk or under plate, *b*, is firmly secured a hollow stem, *c*, having an outwardly convex, barrel-shaped, or oval wall converging to its open end *d*, where the metal is thicker than at any other portion of the stem.

When the front or ornamental part of the button is to be united to the back plate the prongs *g* thereof are inserted into the opening *d* of the hollow stem of the latter, being pressed therein until said prongs are entirely within the cavity of the stem. These prongs will then expand and engage by their convex faces the concave inner wall of the stem, impinging forcibly against the inner surface thereof, and forming a reasonably-secure fastening, sufficient to prevent the accidental separation of the two parts of the button. This separation is, however, readily effected, when necessary, by pulling the ornamental head portion in the direction of the prolongation of the stem of the back plate, whereby the prongs *g* will be readily released from said stem.

The outer faces, *z*, of the prongs are corrugated, and the inner surface, *s*, of the barrel-shaped stem also correspondingly roughened, in order to effect, when the parts are engaged, a strong frictional contact, which will increase the security of the fastening. When the parts are engaged the connection is firm, so that there is no shaking, the button being in general feeling and appearance solid. It can be cheaply manufactured, and is recommended by the completeness of its adaptation to the end in view.

I am aware that it is not new to connect the parts of a separable button by sockets and shanks of various constructions, and I do not claim [illegible]ces, broadly.

Havi[illegible]ibed this invention, what I claim, and desire to secure by Letters Patent, is—

1. A separable stud or button having its face-plate attached to cylindrical barrel-shaped prongs open from end to end, as shown, and its back plate attached to the barrel-shaped stem, said prongs being adapted for telescoping within the stem, as described, whereby the prongs shall, when engaged, be held by their spring action closely against the inner wall of the stem from end to end, substantially as specified.

2. The separable stud or button, consisting of the back plate, *b*, and its open-end, hollow, convex, or barrel-shaped stem *c*, having a roughened inside surface, and the head *a*, having the outwardly-bowed and edge-roughened prongs *g*, corresponding in convexity to the hollow stem *c*, substantially as specified.

In testimony whereof I affix my signature in presence of two witnesses.

DAVID HUMPHREYS.

Witnesses:
W. H. BROUGHTON,
ARTHUR C. HUMPHREYS.